US011787444B2

(12) United States Patent
Kondo et al.

(10) Patent No.: US 11,787,444 B2
(45) Date of Patent: Oct. 17, 2023

(54) MANAGEMENT DEVICE, TRANSPORTATION SYSTEM, MANAGEMENT METHOD, AND RECORDING MEDIUM

(71) Applicant: HONDA MOTOR CO., LTD., Tokyo (JP)

(72) Inventors: Yurie Kondo, Tokyo (JP); Kensaku Yamamoto, Wako (JP); Ryohei Iwaki, Wako (JP); Yusuke Kawada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 295 days.

(21) Appl. No.: 17/177,232

(22) Filed: Feb. 17, 2021

(65) Prior Publication Data

US 2021/0300436 A1  Sep. 30, 2021

(30) Foreign Application Priority Data

Mar. 31, 2020 (JP) ................................. 2020-061998

(51) Int. Cl.
*B60W 60/00* (2020.01)
*G06Q 30/0208* (2023.01)
*B60P 3/00* (2006.01)

(52) U.S. Cl.
CPC ......... *B60W 60/00256* (2020.02); *B60P 3/00* (2013.01); *G06Q 30/0208* (2013.01); *B60W 2420/42* (2013.01); *B60W 2510/30* (2013.01)

(58) Field of Classification Search
CPC ....... B60W 60/00256; B60W 2420/42; B60W 2510/30; B60P 3/00; G06Q 30/0208
See application file for complete search history.

(56) References Cited

U.S. PATENT DOCUMENTS

2013/0046421 A1\*  2/2013  El Fassi ................. B61L 27/04
                                                   701/2
2017/0213164 A1\*  7/2017  Rainbolt ................ G06Q 10/02
(Continued)

FOREIGN PATENT DOCUMENTS

JP    2018-058656       4/2018
JP    2019187557 A  \*  10/2019

OTHER PUBLICATIONS

Wikipedia "Fisheye lens" entry; downloaded Apr. 23, 2019 version from Wayback machine (Year: 2019).\*

(Continued)

*Primary Examiner* — Peter D Nolan
*Assistant Examiner* — Tanya C Sienko
(74) *Attorney, Agent, or Firm* — AMIN, TUROCY & WATSON, LLP

(57) ABSTRACT

A management device is configured to manage an operation of a luggage transporting vehicle, the luggage transporting vehicle being configured to autonomously travel a road without a driver being aboard and including a luggage containment part which is shielded by a door part that is able to be opened and closed, the management device including: an acquisition part configured to acquire a first image obtained by imaging a user who unloads luggage from the containment part; and a determination part configured to determine whether delivery of the luggage contained in the containment part has been completed normally on the basis of a result obtained by monitoring a behavior of the user based on the first image.

8 Claims, 9 Drawing Sheets

(56) References Cited

U.S. PATENT DOCUMENTS

2019/0339692 A1\* 11/2019 Sakai .................. G05D 1/0027
2020/0324793 A1\* 10/2020 Otaki ..................... G08G 1/202
2021/0109515 A1\* 4/2021 Urano ................. G05D 1/0297
2022/0017010 A1\* 1/2022 Taniguchi .............. B65G 61/00
2022/0289249 A1\* 9/2022 Imai ................. B60W 60/0059

OTHER PUBLICATIONS

"WI-FTF Method and Procedures for Tracking baggage and owner" IPCOM 0001783133 (Year: 2009).\*
Machine translation of JP 2019-187557 A "Baggage storage device" downloaded from IP.com Jan. 2, 2023 (Year: 2023).\*

\* cited by examiner

MANAGEMENT DEVICE, TRANSPORTATION SYSTEM, MANAGEMENT METHOD, AND RECORDING MEDIUM

CROSS-REFERENCE TO RELATED APPLICATION

Priority is claimed on Japanese Patent Application No. 2020-061998, filed Mar. 31, 2020, the content of which is incorporated herein by reference.

BACKGROUND OF THE INVENTION

Field of the Invention

The present invention relates to a management device, a transportation system, a management method, and a recording medium.

Description of Related Art

An invention related to an autonomous mobile apparatus that is autonomously movable and an unmanned delivery system configured to delivery luggage using a server system operated in relation therewith has been disclosed (Japanese Unexamined Patent Application, First Publication No. 2018-058656).

SUMMARY OF THE INVENTION

In the related art, it is difficult to check whether delivery of luggage has been completed normally, and the convenience is not sufficient.

An aspect of the present invention is directed to providing a management device, a transportation system, a management method, and a recording medium that are capable of improving convenience.

A management device, a transportation system, a management method, and a recording medium according to the present invention employ the following configurations.

(1) A management device according to an aspect of the present invention is a management device configured to manage an operation of a luggage transporting vehicle, the luggage transporting vehicle being configured to autonomously travel a road without a driver being aboard and including a luggage containment part which is shielded by a door part that is able to be opened and closed, the management device including: an acquisition part configured to acquire a first image obtained by imaging a user who unloads luggage from the containment part; and a determination part configured to determine whether delivery of the luggage contained in the containment part has been completed normally on the basis of a result obtained by monitoring a behavior of the user based on the first image.

(2) A transportation system according to another aspect of the present invention is a transportation system including the management device and the luggage transporting vehicle according to the above-mentioned (1), wherein the luggage transporting vehicle may include an imaging part configured to image the user, and the imaging part may be provided on a surface of the luggage transporting vehicle on which the door part is provided.

(3) In the aspect of the above-mentioned (2), the imaging part may be a fisheye camera.

(4) In the aspect of the above-mentioned (2) or (3), the imaging part may image surroundings of the luggage transporting vehicle so as to obtain a second image used in autonomous traveling of the luggage transporting vehicle.

(5) In the aspect of any one of the above-mentioned (2) to (4), the transportation system may further include a management part configured to individually manage the first image and the second image.

(6) In the aspect of any one of the above-mentioned (2) to (5), the transportation system may further include an external control device that is provided outside the luggage transporting vehicle and that is configured to transmit operation information to the luggage transporting vehicle and to remotely operate the luggage transporting vehicle, wherein the external control device remotely operates the luggage transporting vehicle when there is a problem in managing the operation of the luggage transporting vehicle by the management device.

(7) In the aspect of any one of the above-mentioned (2) to (6), the transportation system may include a request part configured to request closing of the door part provided in the containment part in which the luggage was contained when delivery of the luggage has been completed, wherein, when a first user who has unloaded the luggage from the containment part did not close the door part, the request part requests a second user to whom a luggage was delivered next after the first user to close the door part.

(8) In the aspect of any one of the above-mentioned (2) to (5), the transportation system may include: a request part configured to request closing of the door part provided in a containment part in which luggage was contained, when the delivery of the luggage has been completed; and a assigning part configured to assign a reward to a person who has closed the door part, wherein, when an user who has unloaded the luggage from the containment part did not close the door part, the request part requests another person other than the user to close the door part, and the assigning part assigns the reward to the another person when the another person has closed the door part in response to the request of the request part.

(9) A management method according to another aspect of the present invention is a management method of a management device, the management device being configured to manage an operation of a luggage transporting vehicle which autonomously travels a road without a driver being aboard and which includes a luggage containment part shielded by a door part that can be opened and closed, the management method comprising operation controls of the management device in which: acquiring a first image obtained by imaging a user who unloads luggage from the containment part; and determining whether delivery of the luggage contained in the containment part is completed normally on the basis of a result obtained by monitoring behavior of the user based on the first image.

(10) A computer-readable recording medium according to another aspect of the present invention is a computer-readable recording medium on which a program is stored, the program comprising operation controls of a management device, which is configured to manage an operation of a luggage transporting vehicle that autonomously travels a road without a driver being aboard and that includes a luggage containment part shielded by a door part that can be opened and closed, in which: acquiring a first image obtained by imaging a user who unloads luggage from the containment part; and determining whether a delivery of a luggage contained in the containment part is completed normally on the basis of the result obtained by monitoring behavior of the user based on the first image.

According to the aspects of the above-mentioned (1) to (10), convenience can be improved.

DETAILED DESCRIPTION OF THE INVENTION

Hereinafter, embodiments of a management device, a management method, and a recording medium of the present invention will be described with reference to the accompanying drawings. A luggage transporting vehicle managed by the management device is capable of autonomously traveling on a road without a driver being on board, and has a plurality of luggage containment parts shielded by door parts that can be opened and closed.

The luggage transporting vehicle recognizes situations outside the vehicle using a monitoring unit such as a camera, a radar device, a light detection and ranging (LIDAR), or the like, and in principle, moves on a road by avoiding obstacles on the road while following a route instructed by the management device. The luggage transporting vehicle moves on the road at a speed of about 10 [km/h] when wheels are driven by, for example, a motor. For example, the containment part units of the luggage transporting vehicle form a plurality of luggage carrying spaces (enabling parts) partitioned from other spaces, and allows a plurality of users to load (carry in) their luggage.

The management device manages (controls) an operation of the luggage transporting vehicle. The management device may be a device located at a place different from the luggage transporting vehicle and be able to communicate with the luggage transporting vehicle via a network, or some or all of the functions may be installed on the luggage transporting vehicle. The management device generates, for example, transportation schedule information on the basis of request information acquired by communication from a terminal device of a user. Then, the management device gives instructions regarding a route or a stopping place of the luggage transporting vehicle, an open/closed state of a door of the containment part, and the like, to the luggage transporting vehicle on the basis of the transportation schedule information.

In the following description, the management device is a device located at a place different from the luggage transporting vehicle (for example, a device referred to as a cloud server), and configured to realize functions through communication with the terminal device of the user or the luggage transporting vehicle via a network.

First Embodiment

Figure 1:
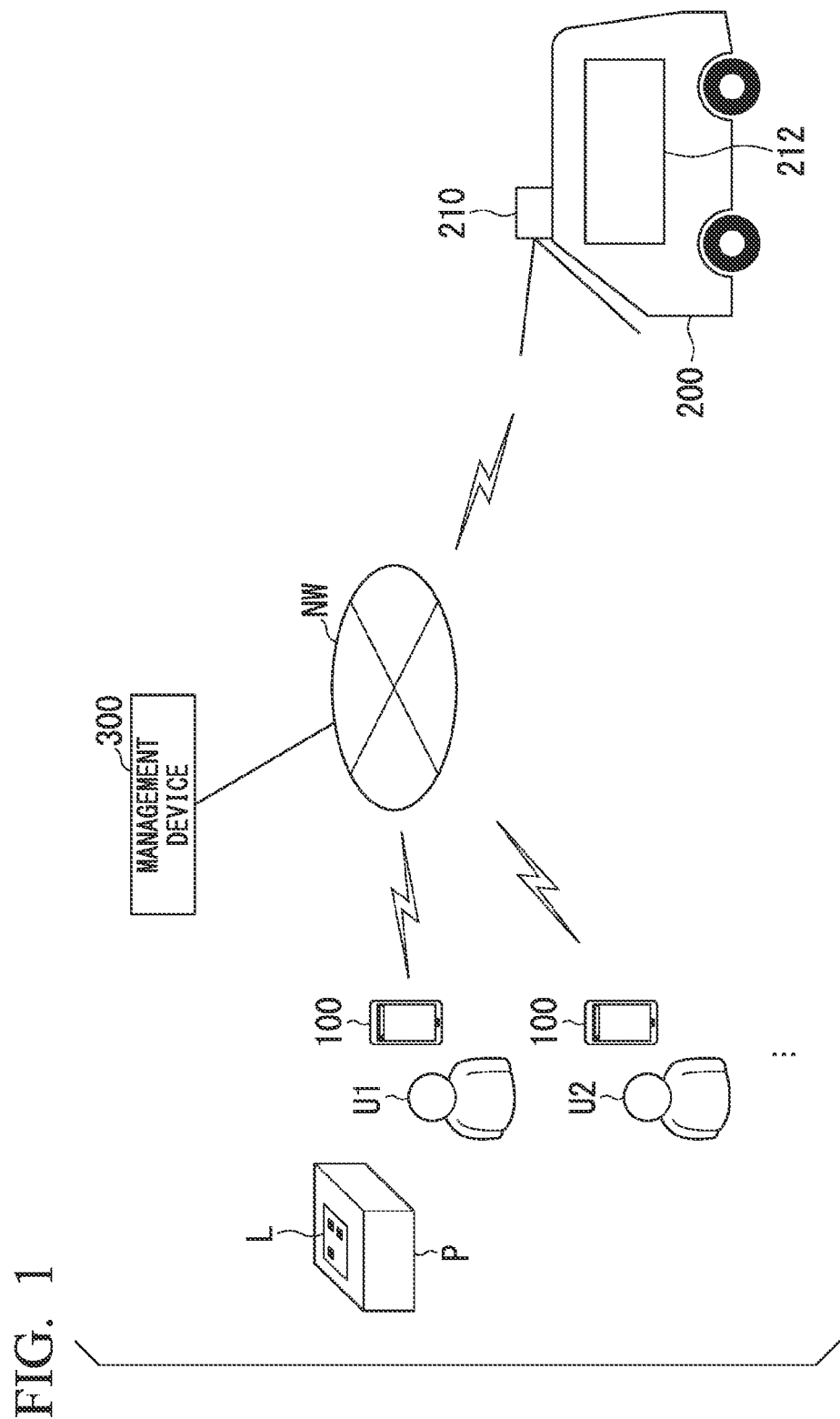
FIG. 1 is a configuration view of a transportation system including a management device.

First a first embodiment will be described.
[Entire Configuration]
FIG. 1 is a configuration view of a transportation system 1 including a management device 300. The transportation system 1 includes one or more luggage transporting vehicles 200 and the management device 300. The management device 300 communicates with a terminal device 100 used by a plurality of users including users U1 and U2 (hereinafter, referred to as "a user U" when a user is not specified) via a network NW. The network NW includes the Internet, a wide area network (WAN), a local area network (LAN), a public line, a provider device, a dedicated line, a radio base station, and the like. In addition, the management device 300 communicates with the luggage transporting vehicle 200 via the network NW. "The terminal device used by a user" may be a terminal device that can be used by an unspecified large number of people, for example, terminal devices in an Internet café, or the like, or may include a terminal device that is temporarily used by a user. In either case, "the terminal device of the user" refers to a terminal device for which the user being operated is specified by, for example, a login operation in which a login name is input.

The user U transmits request information, which requests transportation of luggage P, to the management device 300 using the terminal device 100. Identification information of the luggage P and/or the user U is stated on a label L assigned to the luggage P, or is stored in a built-in IC tag or the like. "Assigned" means, for example, affixed by a seal.

The terminal device 100 is, for example, a smartphone, a tablet terminal, a personal computer, or the like. In the terminal device 100, an application program, a browser, or the like, for using the above-mentioned service is started and supports a service described below. In the following description, it is assumed that the terminal device 100 is a smart phone and the application program (the transportation service application) for receiving the service is running. The transportation service application communicates with the management device 300 according to an operation of the user, transmits the request information from the user to the management device 300, and provides information based on the information received from the management device 300. The request information is electronic information that requests that the luggage P is transported over a designated route by the luggage transporting vehicle 200.

[Luggage Transporting Vehicle]

Figure 2:
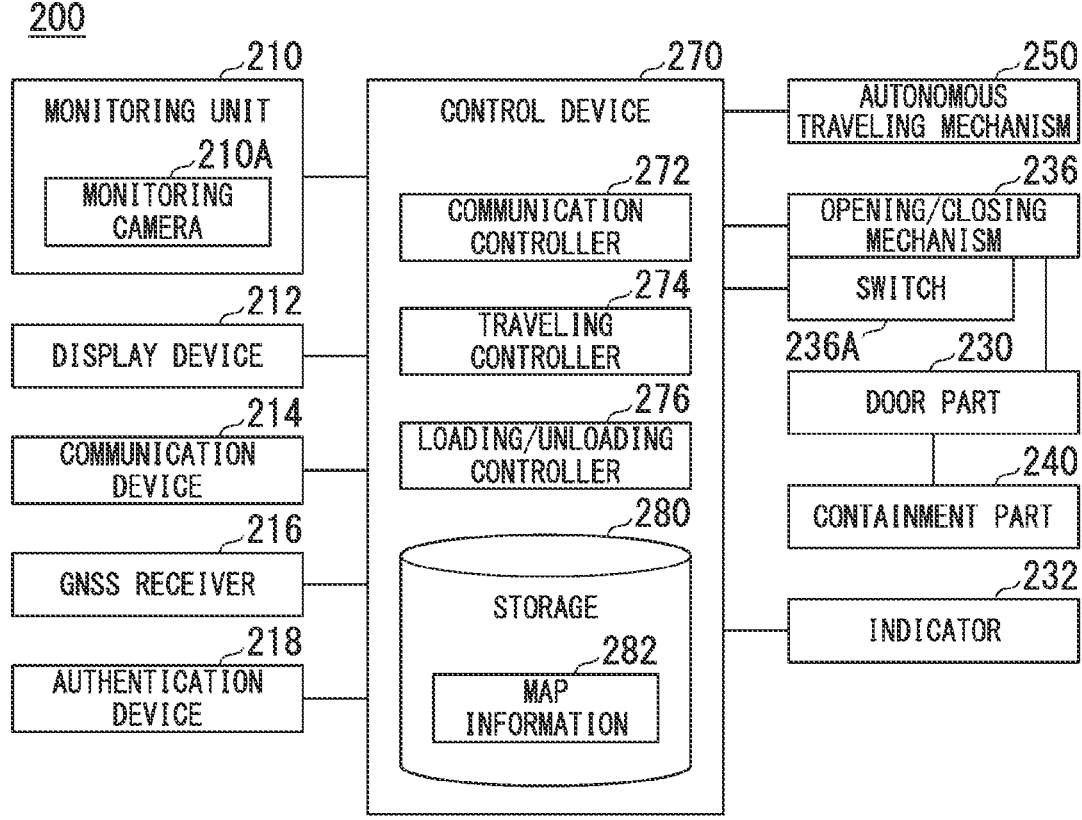
FIG. 2 is a configuration view of a luggage transporting vehicle.

FIG. 2 is a configuration view of the luggage transporting vehicle 200. The luggage transporting vehicle 200 has a monitoring unit 210, a display device 212, a door part 230, a containment part 240, a communication device 214, a GNSS receiver 216, an authentication device 218, an indicator 232, an opening/closing mechanism 236, an autonomous traveling mechanism 250, and a control device 270.

The luggage transporting vehicle 200 includes the monitoring unit 210 such as a camera, a radar device, a LIDAR, or the like, and autonomously travels on the road as described above. The display device 212 may be provided in the luggage transporting vehicle 200. The luggage transporting vehicle 200 includes, for example, the plurality of containment parts 240 in which the door parts 230 are provided. A containment part unit is constituted by the plurality of containment parts 240.

The monitoring unit 210 includes, for example, a monitoring camera 210A. The monitoring camera 210A is provided on, for example, a surface of the luggage transporting vehicle 200 in which the containment part 240 is provided (see FIG. 3). The monitoring camera 210A is, for example, using a fisheye camera lens. The monitoring camera 210A images the surroundings of the luggage transporting vehicle 200 in order to obtain an autonomous driving (AD) image used in autonomous traveling. The monitoring unit 210 causes the monitoring camera 210A to image the outside of the luggage transporting vehicle 200, for example, at predetermined time intervals, for example, every few seconds to every few minutes.

The monitoring unit 210 causes the communication device 214 to transmit the image acquired through imaging of the monitoring camera 210A to the management device 300. The monitoring camera 210A may be accommodated in a camera accommodating part or the like protruding outward from a surface on which the containment part 240 is provided, and may be provided on a surface on which the containment part 240 is provided. The monitoring camera 210A is an example of the imaging part.

The display device 212 displays various pieces of information, for example, information which is desired to be transmitted to the user U, advertisements for the general public, or the like, regarding delivery under control of the control device 270. The display device 212 may have a function of a touch panel, or may have an embedded function for communicating with a contactless IC card.

The communication device 214 is, for example, a wireless communication module connected to the network NW or directly communicating with a terminal device or the like of another vehicle or a pedestrian. The communication device 214 performs wireless communication on the basis of Wi-Fi, dedicated short range communications (DSRC), Bluetooth (Registered trademark), and other communication standards. As the communication device 214, a plurality of devices may be provided according to the purpose.

The GNSS receiver 216 measures a position of a host device (a position of the luggage transporting vehicle 200) on the basis of radio waves received from GNSS satellites (for example, GPS satellites). The GNSS receiver 216 outputs the positioning result to the control device 270.

The authentication device 218 is a device configured to confirm that a user who intends to load the luggage P into the luggage transporting vehicle 200 is a prescribed user (a user has been authenticated). The prescribed user refers to a user who has an agreement (reservation) regarding luggage transportation with the management device 300. The authentication device 218 may be any device as long as it has an authentication function, for example, a short-range wireless communication device, a living body authentication device, a password input device, or the like. The authentication device 218 outputs the authentication result to the control device 270.

The opening/closing mechanism 236 includes a link mechanism provided on each of the door parts 230 and configured to cause the state of the door part 230 to change between an open state and a closed state, and a locking mechanism configured to lock the door part 230 in a closed state. When the door part 230 of the containment part 240 used by the user U is unlocked, the indicator 232 (to be described below) lights up, and the user U manually opens and closes the door part 230. The locking mechanism locks the door part 230 when the user closes the door part 230 and the door part 230 is located at a predetermined position.

A switch 236A is attached to the opening/closing mechanism 236. The switch 236A outputs closing information to a loading/unloading controller 276 as the user U closes the door parts 230 and locks the locking mechanism to the door parts 230. The opening/closing mechanism 236 may be a mechanism including a motor, an arm, or the like, and configured to automatically open and close the door part 230 according to, for example, the opening/closing instruction of the loading/unloading controller 276 regardless of an operation of the user U. In this case, the door part 230 is a so-called automatic door. In this case, the switch 236A may simply output the closing information to the loading/unloading controller 276 when the door part 230 is closed.

Figure 3:
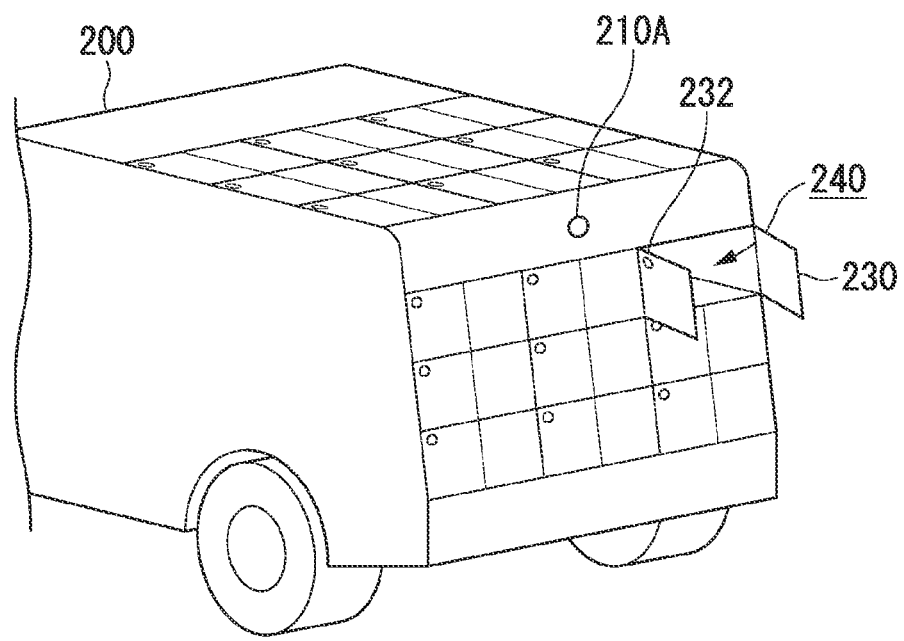
FIG. 3 is a view showing an example of a structure related to a plurality of containment parts.

FIG. 3 is a view showing an example of a structure related to the plurality of containment parts 240. The luggage transporting vehicle 200 includes the plurality of containment parts 240. In the configuration shown, nine containment parts 240 that open on the side of the upper surface of the luggage transporting vehicle 200 and nine containment parts 240 that open on the side of the rear surface are provided in the luggage transporting vehicle 200. The door parts 230 are provided on the containment parts 240, respectively. The door parts 230 are opened and closed, for example, in the form of a gatefold cover (hinged double doors), and expose at least some of the containment parts 240 in the open state. The indicators 232 are attached so as to correspond to each of the containment parts 240 (for example, on the side of front surfaces of the door parts 230). The indicator 232 is constituted by, for example, a light emitting diode (LED). The indicator 232 is caused to emit light by the loading/unloading controller 276 so as to display a loading position of the luggage P that is loaded, or a position at which the luggage P that is unloaded is contained. One luggage P or a luggage P of one user U is arranged to be contained in each of the containment parts 240. For example, at a luggage collection center, the luggage P contained in the containment part 240 are recognized to whom the luggage P belongs to based on which containment part 240 the luggage P are contained. Then, since a label is assigned to the luggage P by, for example, a worker in the luggage collection center, the destination (unloading point) can be specified in the subsequent flow operation.

The autonomous traveling mechanism 250 includes a wheel, a driving power source such as a motor or the like, an energy accumulation means such as a battery or the like, a steering mechanism, and the like. The autonomous traveling mechanism 250 moves the luggage transporting vehicle 200 in an arbitrary direction according to the instruction from the control device 270.

The control device 270 includes, for example, a communication controller 272, a traveling controller 274, and the loading/unloading controller 276. These components are realized by executing a program (software) using a hardware processor, for example, a central processing unit (CPU) or the like. Some or all of these components may be realized by hardware (a circuit part: including circuitry) such as a large scale integration (LSI), an application specific integrated circuit (ASIC), a field-programmable gate array (FPGA), a graphics processing unit (GPU), or the like, or may be realized by cooperation of software and hardware. The program may be previously stored in a storage device (a storage device including a non-transient recording medium) such as a hard disk drive (HDD), a flash memory, or the like, may be stored in a detachable recording medium (a non-transient recording medium) such as a DVD, a CD-ROM, or the like, or may be installed in a storage device by mounting a recording medium in a drive device. The control device 270 has a storage 280 in which map information 282 is stored. The storage 280 is an HDD, a flash memory, a ROM, a random access memory (RAM), or the like.

The communication controller 272 acquires route information from the management device 300 via the communication device 214, and outputs the acquired route information to the traveling controller 274. The communication controller 272 uploads position information showing a position measured by the GNSS receiver 216 to the management device 300 using the communication device 214. For example, uploading of the position information is periodically performed in milliseconds to seconds.

The traveling controller 274 controls the autonomous traveling mechanism 250 such that the luggage transporting vehicle 200 travels along a route designated by the management device 300. For example, the traveling controller 274 matches the route acquired from the management device 300 with output of the map information 282 and the monitoring unit 210, and determines a detailed route such that the luggage transporting vehicle 200 travels on it. The traveling controller 274 drives the luggage transporting vehicle 200 to avoid a contact with an object (including a guard rail, a curbstone, or the like) to which a position or a speed is input from the monitoring unit 210 while driving on the route in principle.

The traveling controller 274 stops the luggage transporting vehicle 200 when the stopping instruction is acquired from the management device 300. Instead of this, when the stopping position information is included in the route information, the traveling controller 274 may stop the luggage transporting vehicle 200 when the positioning result of the GNSS receiver 216 coincides with the stopping position. That is, the information related to the stopping instruction or the stopping position from the management device 300 is provided to the traveling controller 274, and the traveling controller 274 stops the luggage transporting vehicle 200 according thereto. The position at which the luggage transporting vehicle 200 is stopped includes a position on the road. In particular, in a scene in which the user U loads the luggage P into the containment part 240 of the luggage transporting vehicle 200, the luggage transporting vehicle 200 stops on the road, a parking lot, or the like.

The loading/unloading controller 276 drives the indicator 232 and the opening/closing mechanism 236, for example, at a timing instructed from the management device 300. The loading/unloading controller 276 generates stopping information and drives the opening/closing mechanism 236, for example, under a condition that the luggage transporting vehicle 200 stops on the basis of the stopping instruction transmitted from the management device 300.

The loading/unloading controller 276 acquires the generated stopping information and the image output from the monitoring camera 210A when the opening/closing mechanism 236 is driven. The image output from the monitoring camera 210A is an image obtained by imaging the user who unloads the luggage P from the containment part 240 (hereinafter, referred to as "a first image") when the user is unloading the luggage from the containment part 240, and is an AD image (hereinafter, referred to as "a second image") when the luggage transporting vehicle 200 is autonomously traveling. Since the monitoring camera 210A is the camera configured to image the AD image, the first image is an image utilizing the second image. The second image may be an image obtained by imaging by a camera which configured to capture the second image and which is a camera other than the monitoring camera 210A. The communication controller 272 causes the communication device 214 to transmit the stopping information and the image acquired by the loading/unloading controller 276 to the management device 300. The image that is not treated as the first image among the images obtained through imaging by the monitoring camera 210A may be treated as the second image.

[Management Device]

Figure 4:
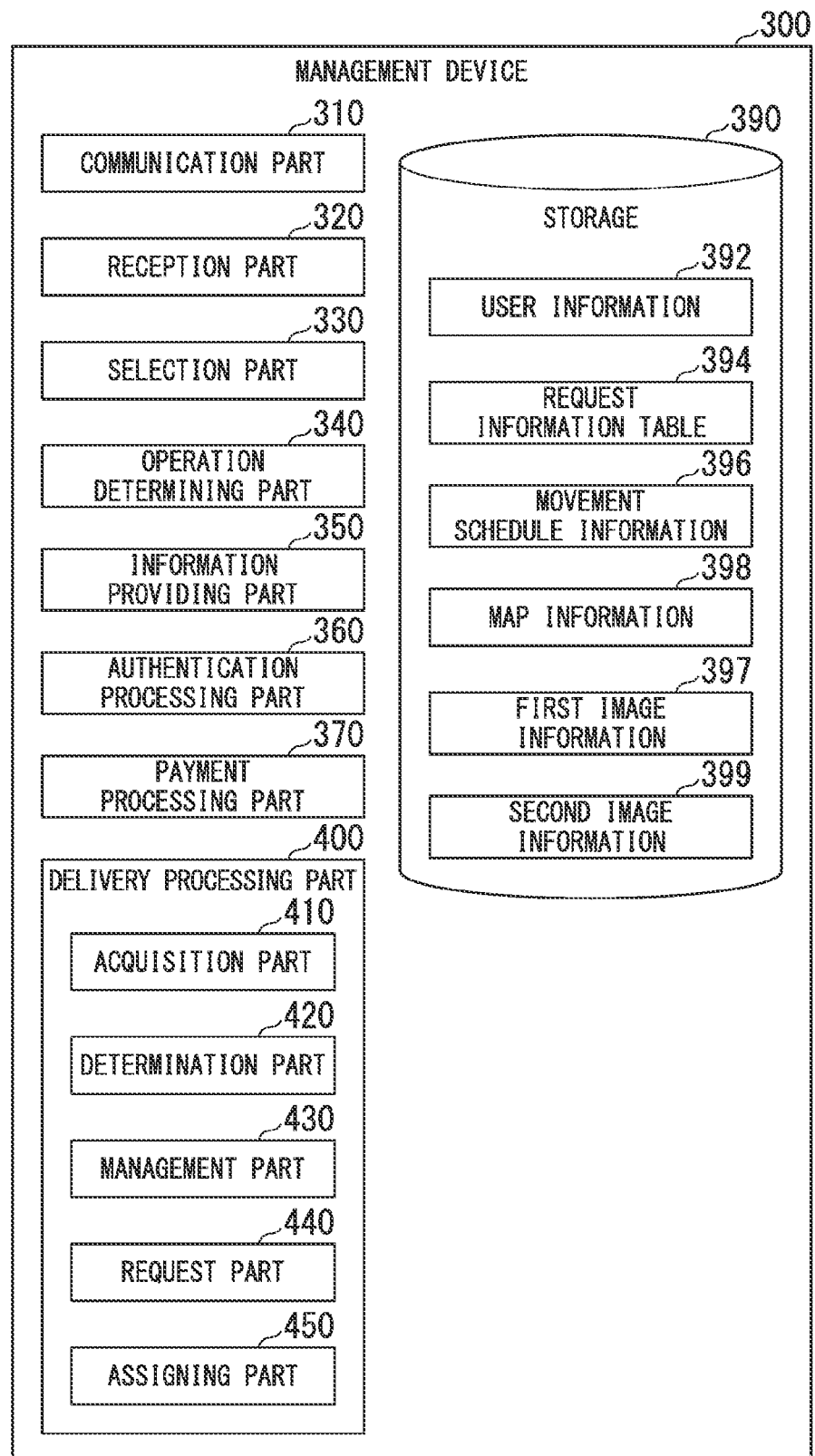
FIG. 4 is a configuration view of the management device.

FIG. 4 is a configuration view of the management device 300. The management device 300 includes, for example, a communication part 310, a reception part 320, a selection part 330, an operation determining part 340, an information providing part 350, an authentication processing part 360, a payment processing part 370, and a delivery processing part 400. These components are realized by executing a program (software) using a hardware processor such as a CPU or the like. Some or all of these components may be realized by hardware (a circuit part: including circuitry) such as an LSI, an ASIC, an FPGA, a GPU, or the like, or may be realized by cooperation of software and hardware. The program may be previously stored in a storage device (a storage device including a non-transient recording medium) such as an HDD, a flash memory, or the like, may be stored in a detachable recording medium (a non-transient recording medium) such as a DVD, a CD-ROM, or the like, or may be installed in a storage device by mounting a recording medium in a drive device. The management device 300 may include a storage 390. The storage 390 is realized by a DVD, a random access memory (RAM), a flash memory, or the like. The storage 390 stores user information 392, a request information table 394, movement schedule information 396, first image information 397, map information 398, second image information 399, or the like. The first image information 397 includes, for example, a plurality of first images written in the storage 390 by a management part 430, and the second image information 399 includes, for example, a plurality of second image written in the storage 390 by the management part 430, which will be described below.

The user information 392 is, for example, information in which communication identification information, a name, a gender, an age, an address, an occupation, and the like, correspond to a user ID that is identification information of the user U. In the request information table 394, information such as a loading point (a delivery source point, a luggage collecting point), an unloading point (a delivery destination point), a delivery desiring time, a luggage type showing a size or a shape of the luggage P, and the like, is registered with respect to each luggage P. The movement schedule information 396 includes information that defines movement of each luggage transporting vehicle 200.

Figure 5:
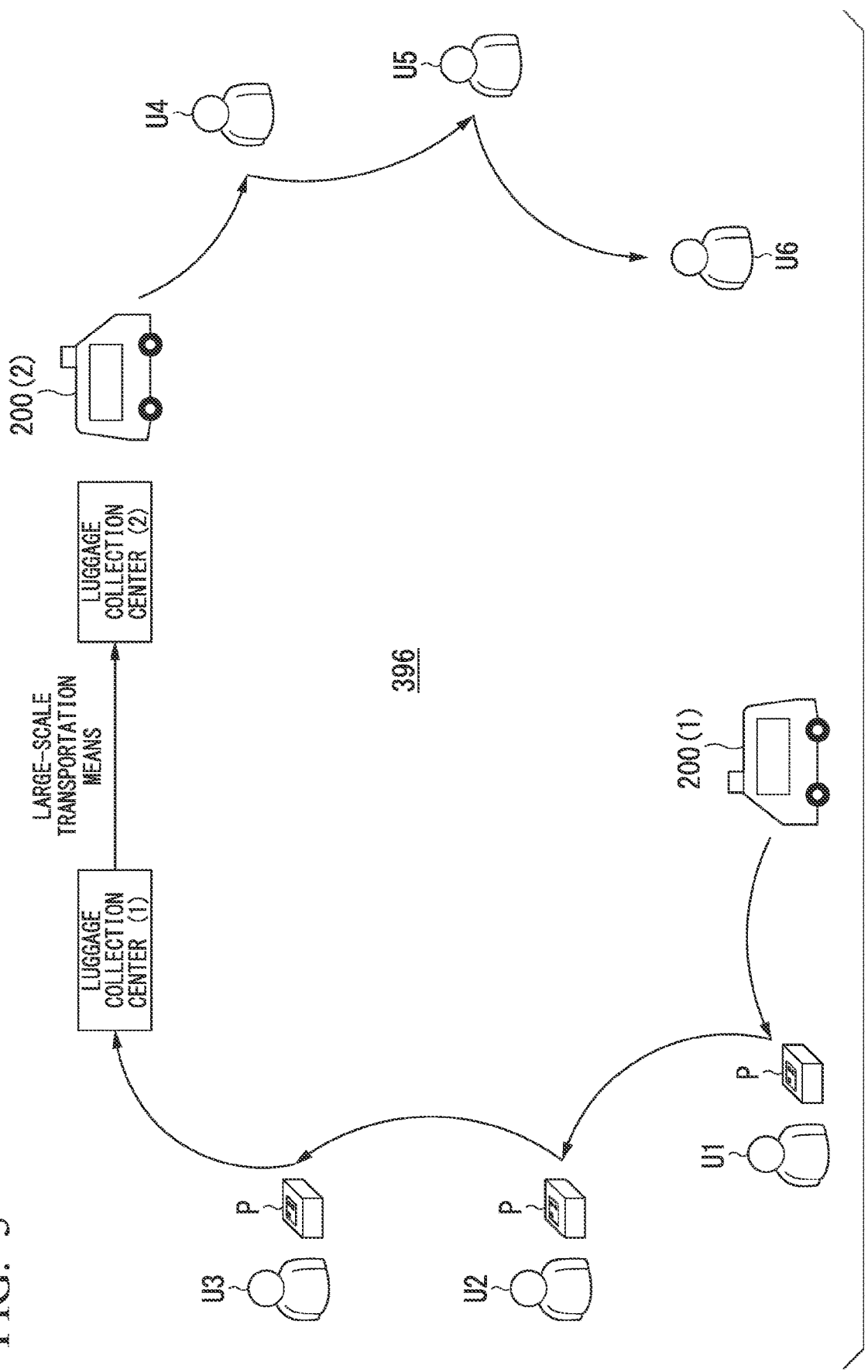
FIG. 5 is a view conceptually showing contents of movement schedule information.

FIG. 5 is a view conceptually showing contents of the movement schedule information 396. As shown, the movement schedule information 396 contains information that defines a series of operations of causing a certain luggage transporting vehicle 200 (1) to pick up the luggage P of the user U1 at a loading point and loading desiring time of the user U1, then, pick up the luggage P of the user U2 at a loading point and loading desiring time of the user U2, then, pick up the luggage P of the user U3 at a loading point and loading desiring time of the user U3, and transport the luggage to a luggage collection center (1). In the luggage collection center, after sorting the collected luggage P by every zone of a delivery destination, a work of transporting the luggage to another luggage collection center is performed. For example, the luggage P is transported by a large-scale transportation means such as a large truck, a railroad, or the like, between the luggage collection centers (in the drawings, from a luggage collection center (1) to a luggage collection center (2)). The movement schedule information 396 may further contain information that defines an operation to deliver the luggage P in sequence of the users U4, U5 and U6 from the luggage collection center (2). Regarding the delivery to the destination from the luggage collection center, for example, by retrieving the request information table 394 using the label information obtained from the label L as a key, information of the destination (discharge point) is acquired, and the operation of the luggage transporting vehicle 200 (2) is determined based on the information.

Returning to FIG. 4, components of the management device 300 will be described. The communication part 310 is, for example, a network card configured to connect the device to the network NW. The communication part 310 communicates with the terminal device 100 or the luggage transporting vehicle 200 via the network NW. The communication part 310 receives, for example, the stopping information, the image, and the closing information transmitted from the communication device 214 of the luggage transporting vehicle 200, and outputs the information to an acquisition part 410.

The reception part 320 acquires (receives) the request information emitted from the terminal device 100 of the user U via the communication part 310, and adds the information to the request information table 394. The selection part 330 refers the list (not shown) of the luggage transporting vehicles 200 and the movement schedule information 396 when record of new request information is added to the request information table 394, and selects the luggage transporting vehicle 200 provided for the user U according to the request information from the plurality of luggage transporting vehicles 200.

The operation determining part 340 generates the above-mentioned movement schedule information 396. For example, the operation determining part 340 sets some moving patterns in which a plurality of loading points and loading desiring times are arranged in sequence, and refers to the map information 398 to extract an optimal moving pattern and add the optimal moving pattern to the movement schedule information 396 after the record of the request information is roughly grouped for every date, time zone, and area zone. Then, the operation determining part 340 transmits an operation instruction to the luggage transporting vehicle 200 using the communication part 310 according to contents described in the movement schedule information 396. The operation determining part 340 transmits a stopping instruction as an operation instruction when the luggage transporting vehicle 200 that arrives at the delivery destination is stopped to cause the user U to unload the luggage. The management device 300 manages an operation of the luggage transporting vehicle 200 as the operation determining part 340 transmits the operation instruction to the luggage transporting vehicle 200.

The information providing part 350 provides the position information of the luggage transporting vehicle 200 to the terminal device 100 of the user U. The information providing part 350 transmits the position information uploaded by the communication controller 272 of the luggage transporting vehicle 200 using the communication device 214 to the terminal device 100 using the communication part 310.

The authentication processing part 360 acquires, for example, various pieces of information (password, living body information, token, or the like) acquired by the authentication device 218 of the luggage transporting vehicle 200, and informs the operation determining part 340 of information that authentication is succeeded when the acquired information is justified. In response, the operation determining part 340 transmits the information that instructs the luggage transporting vehicle 200 to open which door part 230.

The payment processing part 370 performs processing for collecting a fare from the user U. For example, the payment processing part 370 works with a management server of credit cards or electronic money, and collects the fare from the user U.

The delivery processing part 400 includes, for example, the acquisition part 410, a determination part 420, the management part 430, a request part 440, and a assigning part 450. The acquisition part 410 acquires stopping information, first image, and closing information output from the communication part 310, and outputs the stopping information to determination part 420. The acquisition part 410 outputs the acquired second image to the management part 430. The acquisition part 410 outputs the acquired closing information to the assigning part 450.

The determination part 420 monitors behavior of the user U on the basis of the first image output from the acquisition part 410. The determination part 420 performs determination of whether delivery of the luggage P contained in the containment part 240 has been completed normally (hereinafter referred to as "completion determination") on the basis of the result obtained by monitoring the behavior of the user U. The determination part 420 monitors the behavior of the user U by, for example, processing the first image and tracking the behavior of the user U.

The determination part 420 may perform completion determination using information other than the information such as the first image in combination or the like. For example, a weight sensor may be provided at a placing position of the luggage in the containment part 240, and completion determination may be performed on the basis of the variation of the weight sensor and the first image. The determination part 420 may perform completion determination in combination by further checking of a recipient by electronic signature. The determination part 420 may perform completion determination under a condition that the door part 230 is closed. The determination part 420 outputs the first image used in the completion determination to the management part 430.

The management part 430 individually manages the second image output from the acquisition part 410 and the first image output from the determination part 420. The management part 430 writes the second image output from the acquisition part 410 on the storage 390 as the second image information 399. The management part 430 writes the first image output from the determination part 420 on the storage 390 as the first image information 397.

The request part 440 requests the user or other users than the user (users other than the user) to close the door part 230 when the door part 230 is open after the delivery of the luggage has been completed. The request part 440 generates request information when requesting the closing of the door part 230. The request part 440 transmits the generated request information to the luggage transporting vehicle 200 using the communication part 310. The luggage transporting vehicle 200 that has received the request information requests another person, for example, the second user U2, a third party (another person), etc., to whom the luggage has been delivered next after the first user U1 has unloaded the luggage, to close the door part 230 using, for example, the display device 212 or a sound output device. The first user U1 is an example of the first user, and the second user U2 is an example of the second user.

The assigning part 450 determines whether a person who has closed the door part 230 (hereinafter, referred to as "a closing person") is the user U who is a recipient of the luggage P when the door part 230 is closed after the closing of the door part 230 is requested to the luggage transporting vehicle 200. The assigning part 450 assigns a benefit as a reward to the closing person when it is determined that the determined closing person is a person other than the user U. The benefit assigned to the closing person is, for example, a coupon or other products for the closing person to use the luggage delivery service. The benefit may be available for the luggage delivery service or may be available for other than the luggage delivery service.

[Processing of Luggage Transporting Vehicle 200]

Figure 6:
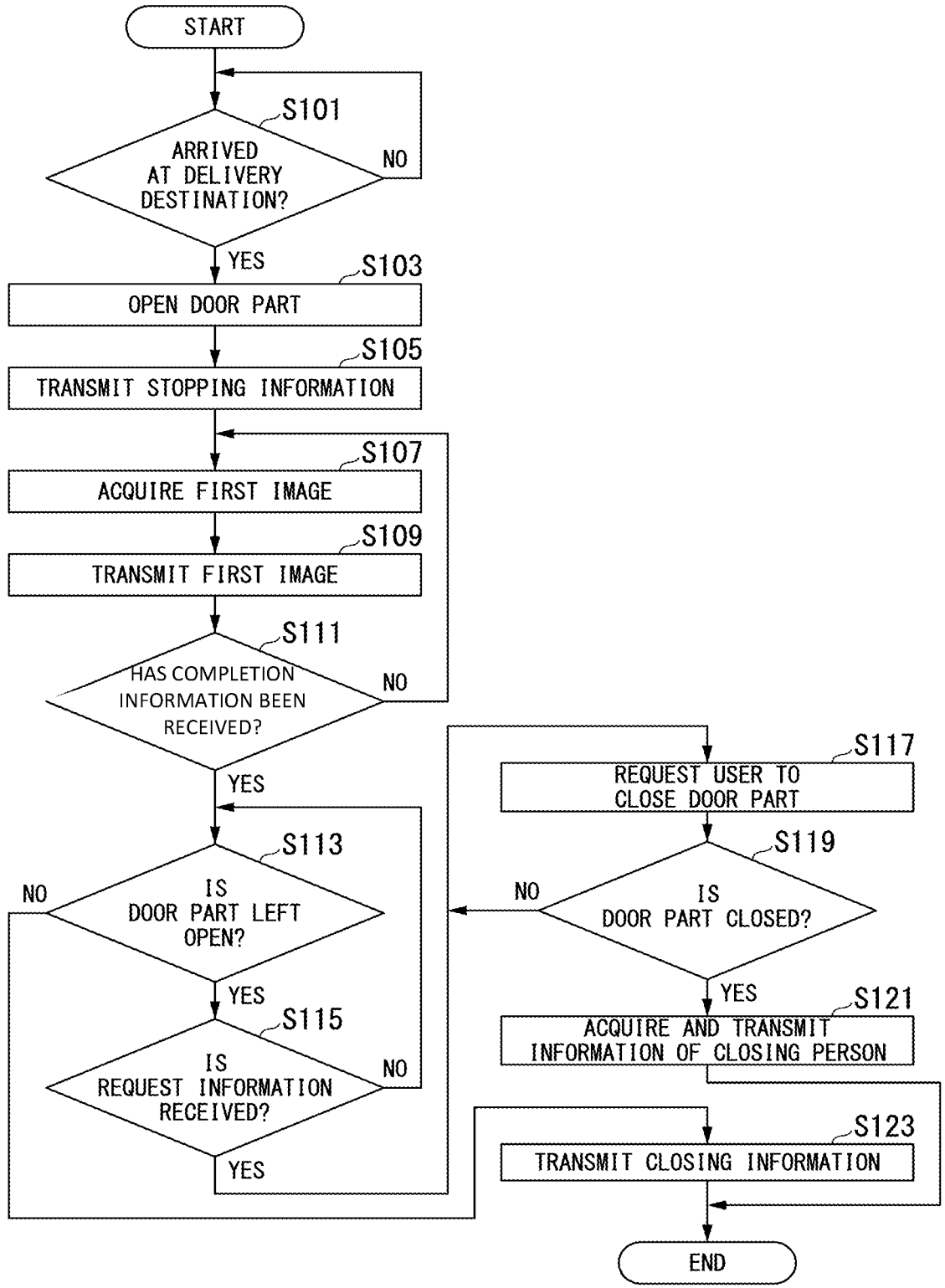
FIG. 6 is a flowchart showing an example of processing of the luggage transporting vehicle.

FIG. 6 is a flowchart showing an example of processing of the luggage transporting vehicle 200. First, the luggage transporting vehicle 200 determines whether the vehicle arrives at the delivery destination (step S101). When it is determined that the vehicle does not arrive at the delivery destination, the luggage transporting vehicle 200 repeats the processing of step S101.

When it is determined that the vehicle arrives at the delivery destination, the luggage transporting vehicle 200 opens the door part 230 (step S103). Next, the loading/unloading controller 276 causes the communication device 214 to transmit the stopping information to the management device 300 (step S105). Next, the monitoring unit 210 images the outside of the luggage transporting vehicle 200 using the monitoring camera 210A and acquires the first image as a predetermined time elapses (step S107). The communication device 214 transmits the first image acquired by the monitoring unit 210 to the management device 300 (step S109).

Next, the loading/unloading controller 276 determines whether the completion information transmitted from the management device 300 is received by the communication device 214 (step S111). When it is determined that the communication device 214 did not receive the completion information, the processing returns to step S107, and the monitoring unit 210 acquires the first image. When it is determined that the communication device receives the completion information, the loading/unloading controller 276 determines whether the door part 230 is in an open state and the door part 230 is not closed by the closing information output from the switch 236A (step S113). When it is determined that the door part 230 is in the open state, the loading/unloading controller 276 determines whether the request information transmitted from the management device 300 is received by the communication device 214 (step S115).

When it is determined that the request information is not received by the communication device 214, the loading/unloading controller 276 returns to step S113 and determines whether the door part is open. When it is determined that the request information is received by the communication device 214, the loading/unloading controller 276 requests the user U to close the door part 230 using the display device 212 or the sound output device (step S117). The loading/unloading controller 276 requests the second user U2 who has received the luggage next after the user U, a third party (another person), or the like, to close the door part 230 when the user U is not nearby.

Next, the loading/unloading controller 276 determines whether the door part 230 is closed (step S119). When it is determined that the door part 230 is not closed, the loading/unloading controller 276 returns to step S117 and continuously requests the user to close the door part 230. When it is determined that the door part 230 is closed, the loading/unloading controller 276 acquires the information of the user who has closed the door part 230, and causes the communication device 214 to transmit the information to the management device 300 (step S121). The information of the user who has closed the door part 230 is, for example, images including the user imaged by the indoor camera 242 or various pieces of information or the like acquired by the authentication device 218. In this way, the luggage transporting vehicle 200 terminates the processing shown in FIG. 6.

In step S113, when it is determined that the door part 230 is closed and do not remain open, the loading/unloading controller 276 causes the communication device 214 to transmit the closing information to the management device 300 (step S123). In this way, the luggage transporting vehicle 200 terminates the processing shown in FIG. 6.

[Processing of Management Device 300]

Figure 7:
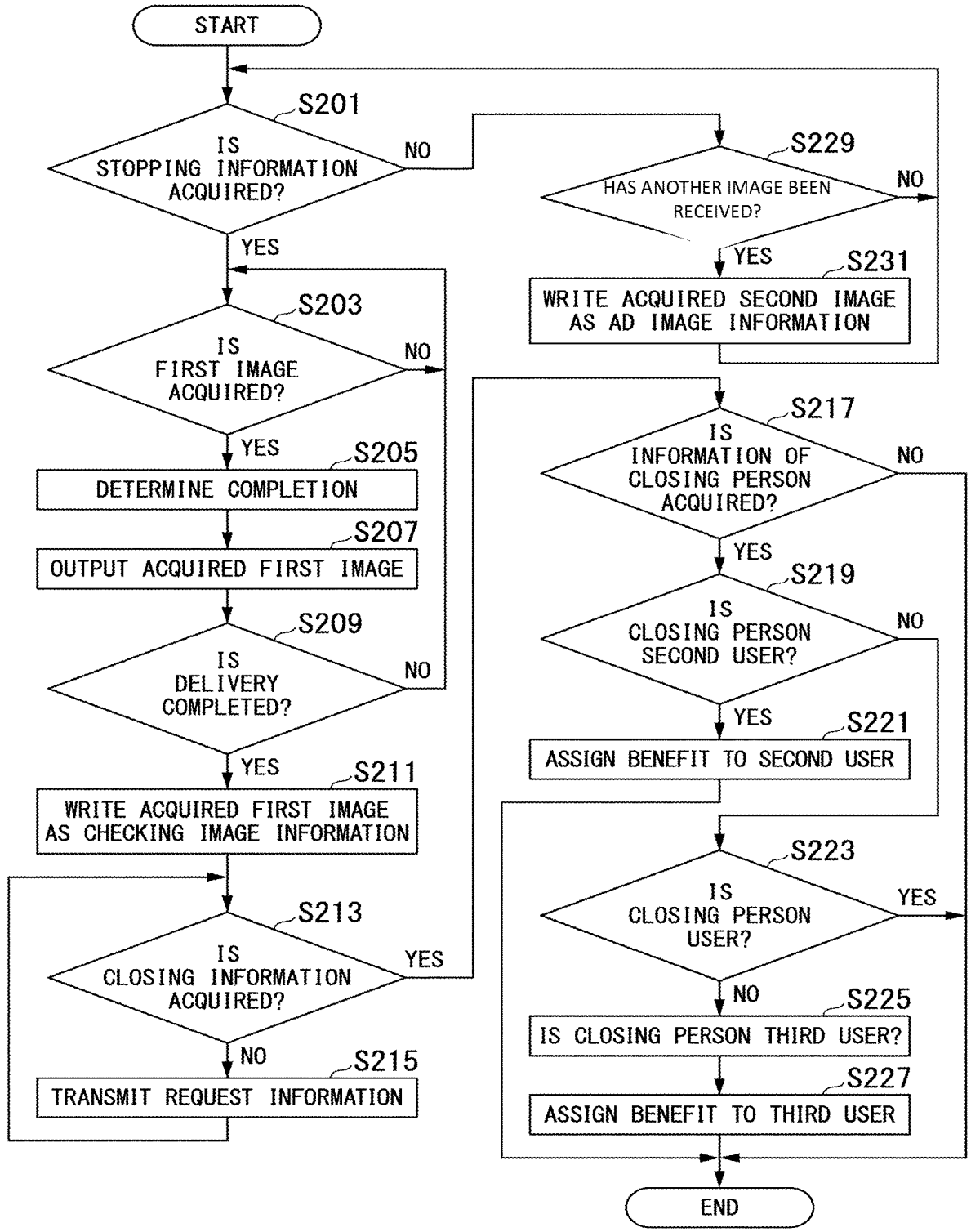
FIG. 7 is a flowchart showing an example of processing of a delivery processing part.

FIG. 7 is a flowchart showing an example of the processing of the delivery processing part 400. The delivery processing part 400 determines whether the stopping information transmitted from the luggage transporting vehicle 200 is acquired by the acquisition part 410 in the determination part 420 (step S201). When it is determined that the stopping information is acquired by the acquisition part 410, the determination part 420 determines whether the first image transmitted from the luggage transporting vehicle 200 is acquired (step S203). When it is determined that the first image is not received, the determination part 420 repeats the processing of step S203.

When it is determined that the first image is received, the determination part 420 performs the completion determination on the basis of the acquired first image (step S205). After the completion determination is performed, the determination part 420 outputs the first image used in the completion determination to the management part 430 (step S207). The determination part 420 tracks behavior of the user U who unloads the luggage P from the containment part 240 by, for example, processing the first image. The determination part 420 determines that the delivery of the luggage P has been completed normally, for example, when the behavior of the user U who has unloaded the containment part 240 is confirmed after the user U has held the luggage P.

Next, the determination part 420 determines whether the delivery has been completed (step S209). When it is determined that the delivery is not completed, the determination part 420 returns to step S203. When it is determined that the delivery has been completed, the management part 430 writes the first image output from the determination part 420 in the storage 390 as the first image information 397 (step S211).

Next, the determination part 420 determines whether the acquisition part 410 has acquired the closing information until a predetermined time has elapsed after the delivery has been completed (step S213). When it is determined that the acquisition part 410 has not acquired the closing information, the request part 440 generates request information and causes the communication part 310 to transmit the generated request information to the luggage transporting vehicle 200 (step S215), and the determination part 420 repeats the processing of step S213.

When it is determined that the acquisition part 410 has acquired the closing information, the assigning part 450 determines whether the information of the closing person transmitted from the luggage transporting vehicle 200 is acquired by the acquisition part 410 (step S217). When it is determined that the acquisition part 410 has not acquired the information of the closing person, the delivery processing part 400 terminates the processing shown in FIG. 7.

When it is determined that the acquisition part 410 has acquired the information of the closing person, the assigning part 450 determines where the closing person is the second user U2 (step S219). When it is determined that the closing person is the second user U2, the assigning part 450 assigns a benefit such as a coupon for using a luggage delivery service to the second user (step S221).

When it is determined that the closing person is not the second user U2, the assigning part 450 determines whether the closing person is the user (step S223). When it is determined that the closing person is the user, the assigning part 450 does not assign the benefit to the user, and the delivery processing part 400 terminates the processing shown in FIG. 7. The assigning part 450 may assign the benefit when the closing person is the user.

When it is determined that the closing person is not the user, the assigning part 450 determines that the closing person is a third party (step S225). Next, the assigning part 450 assigns a benefit or the like that can be used for other than the luggage delivery service to the third party who is the closing person (step S227). Since there is a possibility that the third party is not the user who uses the luggage delivery service, it is preferable that the benefit assigned to the third party is a benefit that can be used for other than the delivery service. In this way, the delivery processing part 400 terminates the processing shown in FIG. 7.

In step S201, when it is determined that the stopping information is not acquired by the acquisition part 410, the acquisition part 410 determines whether the second image transmitted from the luggage transporting vehicle 200 is acquired (step S229). When it is determined that the second image is not acquired, the acquisition part 410 repeats the processing of step S201. When it is determined that the acquisition part 410 has acquired the second image, the management part 430 writes the second image in the storage 390 as the second image information 399 (step S231), and returns to step S201.

The management device 300 of the embodiment determines whether delivery of the luggage P has been completed normally on the basis of the image imaged by the monitoring camera 210A of the monitoring unit 210 mounted in the luggage transporting vehicle 200. For this reason, since it can be easily confirm that delivery of the luggage P has been completed normally, convenience can be improved.

Second Embodiment

Hereinafter, a second embodiment will be described.

Figure 8:
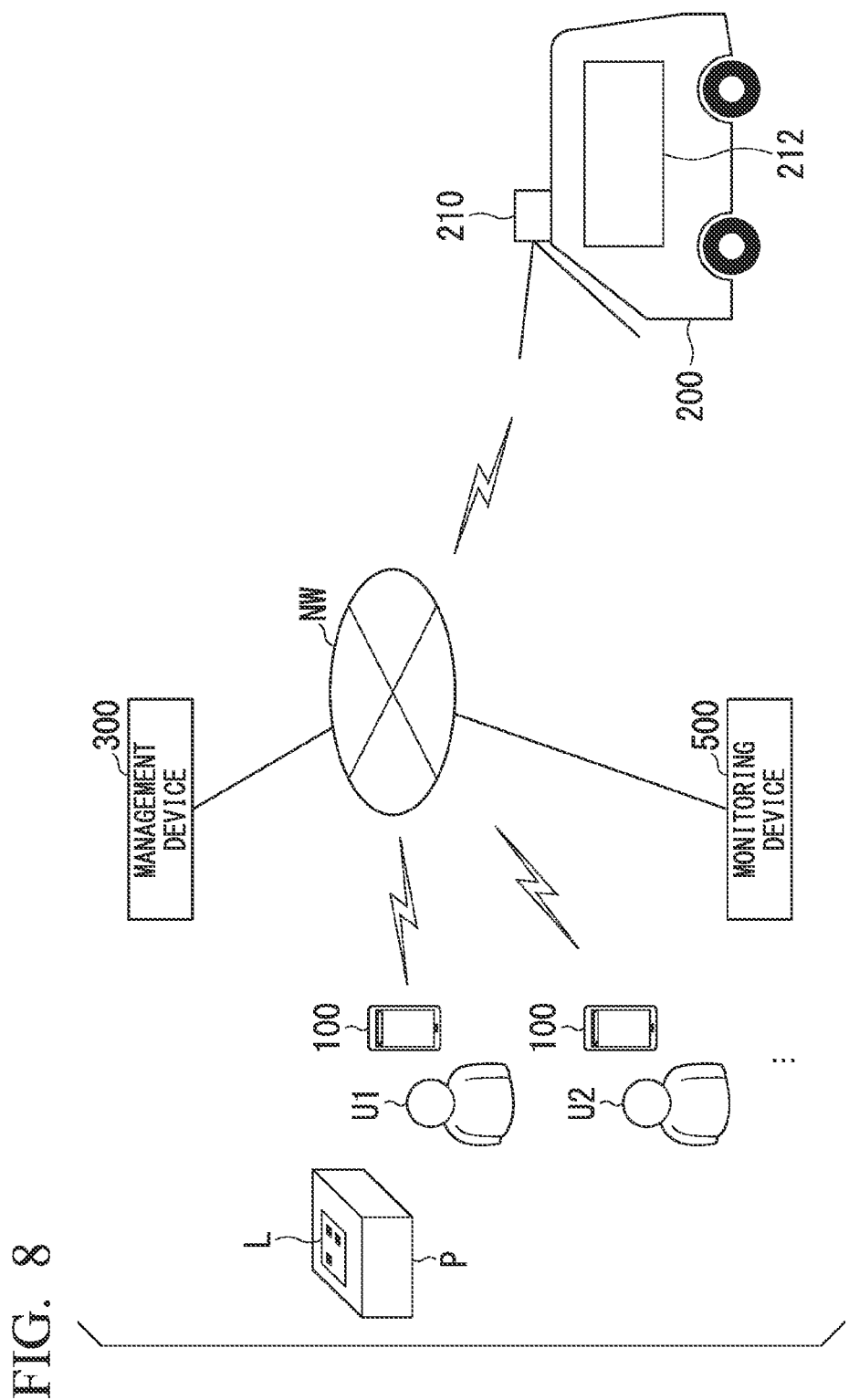
FIG. 8 is a configuration view of a transportation system including a management device according to a second embodiment.

FIG. 8 is a configuration view of a transportation system 2 including a management device 300 according to the second embodiment. The transportation system 2 includes one or more luggage transporting vehicles 200, a management device 300, and a monitoring device 500. The luggage transporting vehicle 200 and the management device 300 have the same configurations as those of the first embodiment. The monitoring device 500 is provided on a delivery base such as a delivery source point or the like. The monitoring device 500 is operated by an operator of the transportation base upon emergency, for example, when there is a problem in managing the operation of the luggage transporting vehicle 200 by the management device 300, or the like.

The monitoring device 500 communicates with the luggage transporting vehicle 200 and the management device 300 via the network NW. The management device 300 transmits the operation instruction transmitted to the luggage transporting vehicle 200 also to the monitoring device 500. The luggage transporting vehicle 200 uploads the position information uploaded to the management device 300 also to the monitoring device 500. The monitoring device 500 monitors management of the operation of the luggage transporting vehicle 200 by the management device 300 on the basis of the operation instruction transmitted from the management device 300 and the position information uploaded by the luggage transporting vehicle 200.

The monitoring device 500 has the same function as that of the traveling controller 274 provided in the luggage transporting vehicle 200. The monitoring device 500 transmits the operation information to the luggage transporting vehicle 200 and controls the autonomous traveling mechanism 250 such that, for example, the luggage transporting vehicle 200 travels the route designated to the luggage transporting vehicle 200 by the management device 300 when there is a problem in managing the operation of the luggage transporting vehicle 200 by the management device 300. The monitoring device 500 remotely operates the luggage transporting vehicle 200 by controlling the autonomous traveling mechanism 250 when there is a problem in managing the operation of the luggage transporting vehicle 200 by the management device 300. The monitoring device 500 is an example of the external control device.

Figure 9:
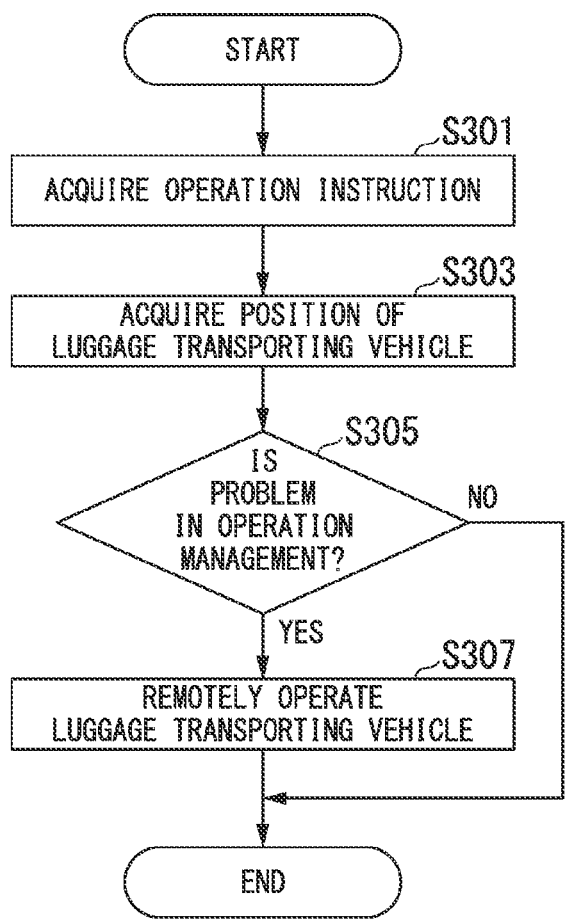
FIG. 9 is a flowchart showing an example of processing of a monitoring device.

FIG. 9 is a flowchart showing an example of processing of the monitoring device 500. The monitoring device 500 acquires the operation instruction transmitted from the management device 300 (step S301). The operation instruction acquired by the monitoring device 500 is the same as the operation instruction transmitted to the luggage transporting vehicle 200 by the management device 300.

Next, the monitoring device 500 receives the position information uploaded by the luggage transporting vehicle 200, and acquires a position of the luggage transporting vehicle 200 on the basis of the received position information (step S303). Next, the monitoring device 500 determines whether there is a problem in managing the operation of the luggage transporting vehicle 200 by the management device 300 (step S305). The monitoring device 500 determines that there is no problem in management, for example, when the position of the luggage transporting vehicle 200 is a position corresponding to the operation instruction of the management device 300. The monitoring device 500 determines that there is a problem in management when the position of the luggage transporting vehicle 200 is not the position corresponding to the operation instruction of the management device 300.

When it is determined that there is no problem in managing the operation of the luggage transporting vehicle 200, the monitoring device 500 terminates the processing shown in FIG. 9. When it is determined that there is a problem in managing the operation of the luggage transporting vehicle 200, the monitoring device 500 generates the operation information on the basis of the operation instruction transmitted from the management device 300. The monitoring device 500 remotely operates the luggage transporting vehicle 200 by transmitting the generated operation information to the luggage transporting vehicle 200 and controlling the autonomous traveling mechanism 250 (step S307). In this way, the monitoring device 500 terminates the processing shown in FIG. 9.

In the second embodiment, while the monitoring device 500 may be provided separately from the management device 300, a part of the management device 300 may function as the monitoring device 500. In this case, in the management device 300, for example, when there is a problem in managing the operation of the luggage transporting vehicle 200, for example, when the operation instruction with respect to the luggage transporting vehicle 200 in the operation determining part 340 cannot be generated, the management device 300 may generate an operation instruction according to the operation of the operator and transmit the operation instruction to the luggage transporting vehicle 200.

[Other Aspects]

In each of the embodiments, while the management device 300 is provided independently from the luggage transporting vehicle 200, some or all of the functions of the management device 300, for example, the delivery processing part 400 (a delivery processing function) may be provided in the luggage transporting vehicle 200. In this case, for example, some or all or the functions of the control device 270, for example, the function of the loading/unloading controller 276 may be provided in the management device. The indoor camera 242 may be disposed at a position where the plurality of containment parts 240 can be imaged. In this case, a partition (wall) that partitions the containment parts 240 may be transparent, or an opening may be formed in the partition.

In each of the embodiments, the management device 300 may write the first image in the storage 390 when delivery of the luggage P is not completed normally. In this case, when the luggage P in the containment part 240 is taken away by, for example, a person other than the user at the delivery destination, since the person who took away the luggage P can be imaged, fraud can be prevented. For example, the first image may be written when the delivery of the luggage P is not completed normally, and the writing may be omitted when the delivery of the luggage P has been completed normally. For this reason, since writing processing is not performed in a situation in which there is little need, the processing burden on the management device 300 can be reduced.

In each of the embodiments, the luggage transporting vehicle 200 may be provided with a regulating tool (a car stopper) configured to restrict movement of the luggage transporting vehicle 200, for example, when stopping instruction is transmitted from the management device 300. In this case, the management device 300 may determine in the determination part 420, for example, when movement of the luggage transporting vehicle 200 is restricted by the regulating tool. In this case, since the determination in the determination part 420 is performed when delivery of the luggage in the luggage transporting vehicle 200 is performed, it is possible to determine whether the delivery of the luggage P has been completed normally in a situation in which there is a high need of determination.

According to the above-mentioned first embodiment, convenience can be improved.

According to the above-mentioned second embodiment, in addition to exhibition of the same effect as the first embodiment, the luggage transporting vehicle 200 can be operated even when the management device 300 malfunctions.

The above-mentioned embodiment can be expressed as described below.

A management device configured to manage an operation of a luggage transporting vehicle autonomously traveling along a road without a driver getting on and including a luggage containment part shielded by a door part that is able to be opened and closed, the management device including:

a storage device in which a program is stored; and a hardware processor, wherein a first image is obtained by imaging a user who unloads luggage from the containment part, and whether delivery of a luggage contained in the containment part has been completed normally is determined on the basis of the result obtained by monitoring behavior of the user based on the first image.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A management device configured to manage an operation of a luggage transporting vehicle, the luggage transporting vehicle being configured to autonomously travel a road without a driver being aboard and comprising a luggage containment part which is shielded by a door part that is able to be opened and closed, the management device comprising:

an acquisition part configured to acquire a first image obtained by imaging a user who unloads luggage from the containment part; and a determination part configured to determine whether delivery of the luggage contained in the containment part has been completed normally on the basis of a result obtained by monitoring a behavior of the user based on the first image, wherein the luggage transporting vehicle comprises an imaging part configured to image the user; and the imaging part is provided on a surface of the luggage transporting vehicle on which the door part is provided;

wherein the management device further comprises a request part configured to request closing of the door part provided in the containment part in which the luggage was contained when delivery of the luggage has been completed, and wherein, when the user who has unloaded the luggage from the containment part did not close the door part, the request part requests a second user to whom a luggage was delivered next after the user to close the door part.

2. The transportation system according to claim 1, wherein the imaging part images surroundings of the luggage transporting vehicle so as to obtain a second image used in autonomous traveling of the luggage transporting vehicle.

3. The transportation system according to claim 2, further comprising a management part configured to individually manage the first image and the second image.

4. The transportation system according to claim 1, wherein the imaging part is a camera comprising a fisheye lens.

5. The transportation system according to claim 1, further comprising an external control device that is provided outside the luggage transporting vehicle and that is configured to transmit operation information to the luggage transporting vehicle and to remotely operate the luggage transporting vehicle, wherein the external control device remotely operates the luggage transporting vehicle when there is a problem in managing the operation of the luggage transporting vehicle by the management device.

6. The transportation system according to claim 1, comprising:
- a request part configured to request closing of the door part provided in a containment part in which luggage was contained, when the delivery of the luggage has been completed; and
- a assigning part configured to assign a reward to a person who has closed the door part,
- wherein, when an user who has unloaded the luggage from the containment part did not close the door part, the request part requests another person other than the user to close the door part, and
- the assigning part assigns the reward to the another person when the another person has closed the door part in response to the request of the request part.

7. A management method of a management device, the management device being configured to manage an operation of a luggage transporting vehicle which autonomously travels a road without a driver being aboard and which comprises a luggage containment part shielded by a door part that can be opened and closed, the management method comprising controlling operations of the management device in which:
- acquiring a first image obtained by imaging a user who unloads luggage from the containment part; and
- determining whether delivery of the luggage contained in the containment part is completed normally on the basis of a result obtained by monitoring behavior of the user based on the first image;
- wherein the luggage transporting vehicle comprises an imaging part configured to image the user; and
- the imaging part is provided on a surface of the luggage transporting vehicle on which the door part is provided;
- wherein the management method further comprises requesting closure of the door part provided in the containment part in which the luggage was contained when delivery of the luggage has been completed, and
- wherein, when the user who has unloaded the luggage from the containment part did not close the door part, requesting a second user to whom a luggage was delivered next after the user to close the door part.

8. A computer-readable recording medium on which a program is stored, the program comprising operation controls of a management device, which is configured to manage an operation of a luggage transporting vehicle that autonomously travels a road without a driver being aboard and that comprises a luggage containment part shielded by a door part that can be opened and closed, in which the program comprises instructions for:
- acquiring a first image obtained by imaging a user who unloads luggage from the containment part; and
- determining whether a delivery of the luggage contained in the containment part is completed normally by monitoring behavior of the user, based on the first image,
- wherein the luggage transporting vehicle comprises an imaging part configured to image the user; and
- the imaging part is provided on a surface of the luggage transporting vehicle on which the door part is provided;
- requesting closure of the door part provided in the containment part in which the luggage was contained when delivery of the luggage has been completed, and
- wherein, when the user who has unloaded the luggage from the containment part did not close the door part, requesting a second user to whom a luggage was delivered next after the user to close the door part.

* * * * *